United States Patent
Wechsler et al.

[11] Patent Number: 5,847,851
[45] Date of Patent: Dec. 8, 1998

[54] DOUBLE-DOPED BATIO₃ CRYSTAL FOR HOLOGRAPHIC STORAGE

[75] Inventors: Barry A. Wechsler, Newbury Park; Marvin B. Klein, Pacific Palisades; Robert N. Schwartz, Westlake Village; Gerald D. Bacher, Santa Ana, all of Calif.

[73] Assignee: Hughes Electronics Corporation, El Segundo, Calif.

[21] Appl. No.: 813,016

[22] Filed: Mar. 6, 1997

[51] Int. Cl.⁶ .................................. G03H 1/02; G03H 1/04
[52] U.S. Cl. ........................ 359/7; 359/4; 359/3; 430/1
[58] Field of Search ................... 359/7, 4, 3; 430/1, 430/2

[56] References Cited

U.S. PATENT DOCUMENTS

| | | | |
|---|---|---|---|
| 4,750,153 | 6/1988 | Owechko et al. | 359/1 |
| 4,773,719 | 9/1988 | Anderson et al. | 359/7 |
| 5,005,927 | 4/1991 | Cudney et al. | 359/7 |
| 5,170,268 | 12/1992 | Ewbank et al. | 359/7 |
| 5,665,493 | 9/1997 | Bai et al. | 359/3 |
| 5,698,344 | 12/1997 | Bai et al. | 359/3 |
| 5,699,175 | 12/1997 | Wilde | 359/7 |
| 5,739,929 | 4/1998 | Macfarlane | 359/3 |

OTHER PUBLICATIONS

D. von der Linde et al, Multiphoton photorefractive processes for optical storage LiNbO₃, Applied Physics Letters, vol. 25, No. 3, pp. 155–157 (1974).

D. von de Linde et al, High–sensitivity optical recording in KTN by two–photon, absorption, Applied Physics Letters, vol. 26, No. 1, pp. 22–24 (1975).

D. von der Linde et al, Optical storage using refractive index changes induced by two–step excitation, Journal of Applied Physics, vol. 47, No. 1, pp. 217–220 (1976).

H. Vormann et al, Two Step Excitation in LiTaO₃: Fe For Optical Data Storage, Solid State Communications, vol. 49, No. 9, pp. 843–847 (1984).

D.L. Staebler et al, Hologram storage in photoochromic LiNbO⁺₃, Applied Physics Letters, vol. 24, No. 6, pp. 268–270 (1974).

K. Buse et al, Activation of BaTiO₃ for infrared holographic recording, Optics Communications, vol. 85, pp. 183–186 (1991).

Changxi Yang et al, Photorefractive properties of Ce:BaTiO₃ crystals, Optic Communications, vol. 113, pp. 416–420 (1995); and.

Yong Zhu et al, Phase conjugation of BaTiO₃:CE by backward stimulated photorefractive scattering, Applied Physics Letters, vol. 64, No. 18, pp. 2341–2343 (1994).

*Primary Examiner*—Cassandra C. Spyrou
*Assistant Examiner*—Audrey Chang
*Attorney, Agent, or Firm*—V. D. Duraiswamy; W. K. Denson-Low

[57] ABSTRACT

A new photorefractive material comprises BaTiO₃ double-doped with two dopant species, both of which have at least two valence states, with one of the dopant species (e.g., cerium) having an ionization level that is near the middle of the barium titanate bandgap and the other dopant species (e.g., rhodium) having an ionization level that is closer to the valence band edge of barium titanate, such that both dopant species are sensitive to visible light, but only one dopant species (the one closer to the valence band edge) is sensitive to infrared radiation. The double-doped BaTiO₃ provides a unique combination of photorefractive properties, thereby improving its performance as a holographic storage medium. The double-doped barium titanate crystal is employed as a holographic recording element. The double-doped barium titanate crystal has a dark storage time at room temperature of several years or more and may be nondestructively read out at an infrared wavelength. Recording information on the double-doped barium titanate crystal is done by first sensitizing the double-doped barium titanate crystal with a substantially uniform beam of radiation at one wavelength and then either simultaneously or subsequently storing information in the barium titanate crystal with an incident recording beam that has a wavelength that is longer than that of the sensitizing beam. Nondestructive read-out is accomplished using only the second (writing) beam.

18 Claims, 4 Drawing Sheets

FIG. 4A
BaTio₃:Ce,Rh Crystal

FIG. 4B
BaTio₃:Ce,Rh Crystal

DOUBLE-DOPED BATIO₃ CRYSTAL FOR HOLOGRAPHIC STORAGE

This invention was made with Government support under Agreement No. MDA972-94-2-0008 awarded by the Advanced Research Projects Agency (ARPA). The Government has certain rights in this invention.

BACKGROUND OF THE INVENTION

1. Field of the Invention

The present invention is directed to photorefractive materials, particularly to photorefractive materials employed as holographic storage media, and more particularly to double-doped barium titanate ($BaTiO_3$) photorefractive single crystals.

2. Description of Related Art a. Background on sensitized (two-step) recording

Holographic data storage offers the potential for simultaneous high capacity, high transfer rates, and fast data access at low bit-error rates. There are four critical elements of such a system: (1) the algorithms used to encode and decode data logically in a parallel optical system; (2) the optical devices used to encode and decode data, e.g., lasers, spatial-light modulators, beam deflectors, detectors, and optical imaging systems; (3) the interface electronics; and (4) suitable holographic media. Along with typical requirements of optical quality, a recording material should also be highly sensitive, have a long grating decay time in the dark and provide for some means of nondestructive readout.

A number of techniques for nondestructive readout are available, including mobile ion compensation at high temperatures to create fixed gratings at low temperatures, periodic ferroelectric domain reversal to replicate a trapped charge grating, readout at a less sensitive wavelength, system refresh techniques, and sensitization of a medium at one wavelength for writing at a second wavelength.

In the sensitization approach, a uniform beam incident at one wavelength sensitizes the medium for hologram recording at the same or a second (longer) wavelength in a variety of ways to be discussed below. The grating recording beams are incident either in the presence of the sensitizing beam or subsequent to the sensitizing beam. The gratings may then be probed nondestructively using only the second (writing) wavelength. The sensitizing beam is also sometimes referred to as a "gating" beam.

Figure 1A:
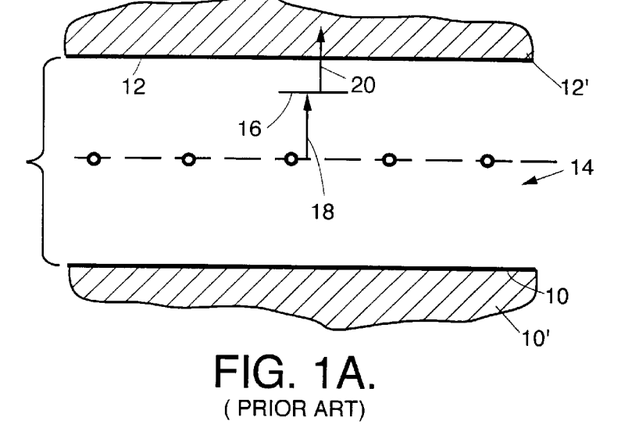
Figure 1B:
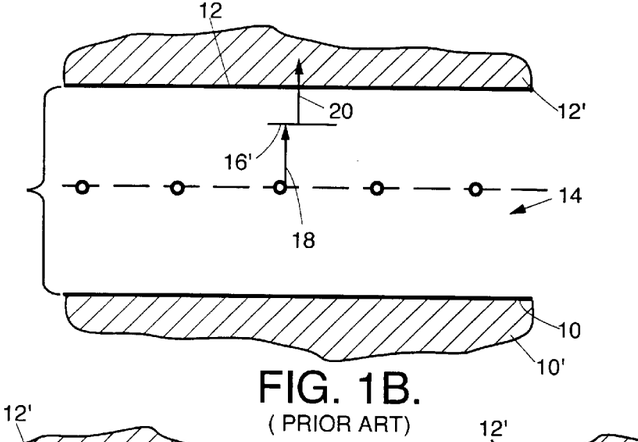
Figure 1C:
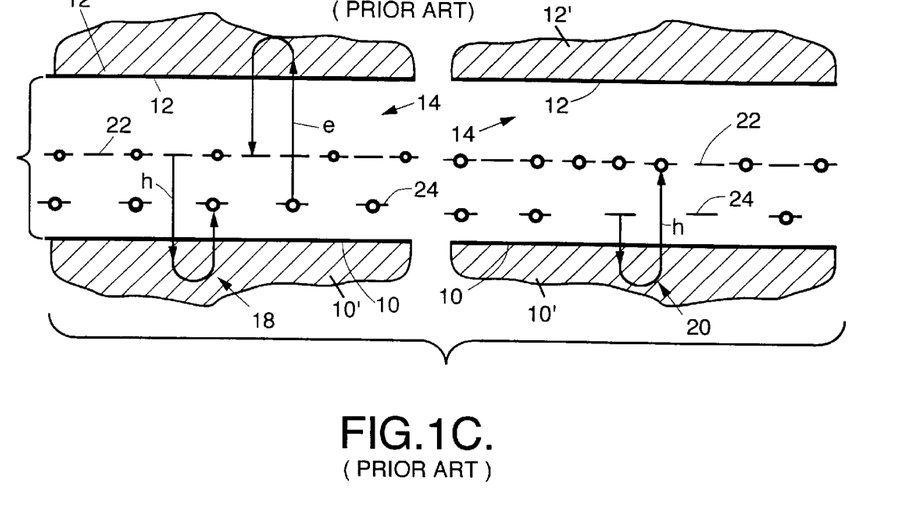

A number of sensitization processes are possible, as shown in FIGS. 1A–1C, which are schematic energy band diagrams of a photorefractive material, showing three two-photon recording techniques, in which FIG. 1A illustrates a two-photon (virtual intermediate state) technique, FIG. 1B illustrates a two-step (real intermediate excited state) technique, and FIG. 1C illustrates a two-step (two species) technique. FIGS. 1A–1C depict a valence band edge 10 and a conduction band edge 12 separated by a bandgap 14. The first type of sensitization process, based on two-photon absorption and shown in FIG. 1A, consists of simultaneous absorption of two photons, in which a nonresonant process (with a virtual intermediate state 16) occurs through a nonlinear polarizability. This process has previously been identified in nominally pure $LiNbO_3$ and $KTa_xNb_{1-x}O_3$; see, e.g., D. von der Linde et al, *Applied Physics Letters*, Vol. 25, pp. 155–157 (1974) and D. von der Linde et al, *Applied Physics Letters*, Vol. 26, pp. 22–24 (1975). Non-resonant gratings require the use of a pulsed laser with a fluence on the order of $J/cm^2$ and a peak pulse intensity of $GW/cm^2$.

Typically, for reasons of convenience, the same laser is used for sensitization 18 and recording 20.

The second type of sensitization process, based on two-step absorption and shown in FIG. 1B, consists of absorption of a photon at one wavelength to generate an intermediate, real excited state 16', followed by absorption of the second photon to generate a free carrier. This process has been identified in $LiNbO_3$:Cr, $LiTaO_3$:Cr, and $LiTaO_3$:Fe; see, e.g., D. von der Linde et al, *Journal of Applied Physics*, Vol. 47, pp. 217–220 (1976) and H. Vormann et al, *Solid State Communications*, Vol. 49, pp. 843–847 (1984). Early research has shown that two-photon, two-step processes are possible in $LiNbO_3$:Cr using a single ruby laser at 694.4 nm. The lifetime of the intermediate state of a Cr impurity in these materials is about 500 ns. Energy fluxes on the order of $J/cm^2$ are required but because this process is a resonant photoexcitation, peak pulse intensities of only 10 $MW/cm^2$ have been used.

The third type of sensitization process, shown in FIG. 1C, requires two separate species of defect centers and consists of two steps, the sensitization step 18 and the recording step 20. The details of charge redistribution resulting from illumination depend on the electron occupancies of the two centers as well as the photoionization cross sections and recombination rates for electrons and holes in the two different centers. For convenience, we denote as the first species the one whose ionization level 22 lies near the middle of the $BaTiO_3$ bandgap 14 and as the second species the one whose ionization level 24 lies closer to the valence band edge 10. The discussion below can be easily modified if the second species lies closer to the conduction band edge 12. We also assume that the Fermi level lies closer to the first species and therefore the centers of species 2 are in a state where they are essentially all filled with electrons, but the centers of species 1 are only partially filled with electrons.

Upon illumination with an appropriate sensitization (or gating) wavelength (preferably in the blue or green spectral region), two separate processes can transfer a hole from the deep level (#1) 22 to the shallower level (#2) 24. In the first process, denoted "e", electrons are photo-excited from the second species 24 to the conduction band 12' and then trapped to some extent by the first species 22. In the second process, denoted "h", holes are photo-excited from the first species 22 to the valence band 10' and then trapped to some extent by the second species 24. In either case, the transfer of holes to species 2 results in a change in the absorption spectrum of the crystal. (Assuming the absorption changes in the visible wavelength region, this corresponds to a change in color, known as "photochromism"). This requirement for photoionization at the gating wavelength and subsequent retrapping is fundamentally different from the first two cases above, in which photoionization at the gating wavelength was prohibited.

As a result of this sensitization step 18, the probability of absorption and photoionization at a second (i.e., recording) wavelength (preferably in the near infrared) has been increased; ideally, the absorption at the recording wavelength should be zero before sensitization occurs. The recording step 20 involves hole "h" photoionization from species 2. Recording beams at the second wavelength will produce holes, which will migrate in the valence band 10' by diffusion or drift and then recombine. The goal is for the spatially modulated charge distribution to be transferred to the species whose ionization level lies closer to mid-gap (i.e., species 1, or level 22, in our notation). This may happen by direct recombination of charges or by a multiple step process. Regardless of the path by which the charges are transferred to the mid-gap level, the resultant refractive index grating can now be read out at the IR recording wavelength without causing photoionization, and thus without erasing the grating. To erase the grating, it suffices to heat the crystal or illuminate it with a uniform white light beam or laser beam at the gating wavelength.

When the first and second wavelengths are different, it is feasible to achieve nondestructive readout. This condition is preferred for holographic storage. Similar effects were reported in $LiNbO_3$ doped with Fe and Mn; see, e.g., D. L. Staebler et al, *Applied Physics Letters*, Vol. 24, pp. 268–270 (1974). However, in that case, ultraviolet light was used to sensitize the photorefractive crystal for recording in the visible wavelength region.

More recently, a sample of another photorefractive crystal, $BaTiO_3$, that had been inactive at infrared wavelengths was reported to be activated for use in the infrared by preillumination with green light, see, e.g., K. Buse et al, *Optics Communications*, Vol. 85, pp. 183–186 (1991). This sensitization is thought to result from a transfer of charge from a deep, partially filled impurity species that is not sensitive in the infrared to another species that is sensitive in the infrared. This experiment comes closest to the invention described herein, but the impurities were unintentional and unidentified. As a result, the short lifetime of the carriers in the second species required the use of high power lasers for gating and for recording. In addition, no provision was made for enhancing the dark storage time.

b. Background on Photorefractive $BaTiO_3$ $BaTiO_3$ crystals singly doped with either Ce or Rh have previously been grown and characterized, although no reports exist of crystals doped simultaneously with both elements. Rh-doped $BaTiO_3$ ($BaTiO_3$:Rh) has been shown to improve the infrared photorefractive response of $BaTiO_3$ (B. A. Wechsler et al, *Optics Letters*, Vol. 19, No. 8, pp. 536–538 (Apr. 15, 1994)) and Ce-doped $BaTiO_3$ ($BaTiO_3$:Ce) has been found to produce strong beam-coupling and self-pumped phase conjugation in the visible wavelength region (C. Yang et al, *Optics Communications*, Vol. 113, pp. 416–420 (1 Jan. 1995) and Y. Zhu et al, *Applied Physics Letters*, Vol. 64, No. 18 pp. 2341–2343 (2 May 1994)). In addition, recent experiments strongly suggest that Ce-doped $BaTiO_3$ has exceptionally long dark storage time (G. D. Bacher et al, *Optics Letters*, Vol. 21, No. 1, pp. 18–20 (Jan. 1, 1996)), which the inventors interpret as indicating nearly intrinsic resistivity resulting from the presence of ionization centers with energy close to the middle of the bandgap. $BaTiO_3$:Ce is also the subject of a Chinese patent application, publication number 1094166A, which discloses the phase conjugation properties of a Ce-doped barium titanate crystal.

However, neither of these crystals ($BaTiO_3$:Ce or $BaTiO_3$:Rh) has all the desired properties for holographic storage. Although $BaTiO_3$:Rh is sensitive in the near-IR and therefore very amenable to use in compact, low-cost diode-laser pumped systems, the storage time of gratings written in this crystal is very limited, on the order of 10 to 20 hours in the dark and less than that if it is exposed to illumination at the wavelength of the writing beams. Although $BaTiO_3$:Ce is capable of storing photorefractive gratings for hundreds or thousands of years in the dark, it is nevertheless sensitive to erasure during readout using the same wavelength used to write the gratings.

Thus, what is needed is a $BaTiO_3$ crystal that is suitable for long term holographic storage and is insensitive to erasure during readout using the same wavelength used to write the gratings.

SUMMARY OF THE INVENTION

In accordance with the present invention, a new photorefractive material comprises double-doped $BaTiO_3$, employing two different dopant species, both of which have at least two valence states, with one of the dopant species having an ionization level that is near the middle of the $BaTiO_3$ bandgap and the other dopant species having an ionization level lying closer to the valence or conduction band edge. The shallower species (i.e., the species whose ionization level lies closer to the conduction band or the valence band) should be sensitive to infrared radiation, but lie far enough from the band edges that charges excited in it persist in the dark for a long time. In this connection, it will be appreciated that there are two issues here: First, one wants the charges to persist for a long time so that one can populate this level using low power lasers or other light sources. The second issue is that this state should persist long enough to record however many gratings one intends to record. There is no definitive length of time, however, because it all depends on how much power is available for recording, how many holograms are to be recorded, etc. Such determination of the length of time is well within the ability of one skilled in this art to make, based on these and other well-known factors.

The species with ionization level at mid-gap should be sensitive to visible radiation but insensitive at the infrared recording wavelength. The double-doped $BaTiO_3$ provides a unique combination of photorefractive properties, thereby improving its performance as a holographic storage medium.

In a preferred example, cerium (Ce) and rhodium (Rh) are employed as the co-dopant species; $Ce^{3+}/Ce^{4+}$ has an ionization level that is near the middle of the $BaTiO_3$ bandgap, while $Rh^{3+}/Rh^{4+}$ has an ionization level that is closer to the valence band edge, making it sensitive in the near-IR.

While cerium alone provides high resistivity and long dark storage time, by virtue of its location near the middle of the $BaTiO_3$ bandgap, it is sensitive to erasure during readout; while rhodium alone enhances the infrared response of $BaTiO_3$, gratings decay in the dark with normal time constants on the order of hours. However, when $BaTiO_3$ is doped with both cerium and rhodium, the crystal retains its long dark storage time (resulting from cerium doping), and the holographic storage performance is improved in a way that is not immediately intuitive. With proper dopant concentrations, the crystal in its initial state has very little sensitivity in the infrared past ~800 nm. However, if a gating laser beam in the blue or green spectral region illuminates the crystal, it is sensitized in the infrared, allowing efficient writing of a grating at ~800 nm. It is then found that this grating can be read out at the same wavelength without erasure, i.e. the readout is nondestructive. The grating can be erased when necessary by a laser in the blue or green spectral region or by a white light source.

Also in accordance with the invention, a holographic recording element comprising the double-doped barium titanate crystal is disclosed. Further, a method of providing the barium titanate crystal having a dark storage time of at least several years and which can be nondestructively read out at an infrared wavelength is disclosed, comprising co-doping the barium titanate crystal with the two dopant species described above. Finally, a method of recording information on the holographic recording element and reading out information stored therein comprises (1) providing the double-doped barium titanate crystal, and (2) writing information by first sensitizing the double-doped barium titanate crystal with a substantially uniform beam of radiation at one wavelength in the visible region and then either simultaneously or subsequently storing information in the barium titanate crystal with an incident recording beam that has a wavelength that is longer than that of the sensitizing beam. Non-destructive read-out is accomplished using only the second (writing) beam.

BRIEF DESCRIPTION OF THE DRAWINGS

FIGS. 1A–1C are schematic band diagrams of a photorefractive material, showing three two-photon recording techniques, in which FIG. 1A illustrates a two-photon (virtual intermediate state) technique, FIG. 1B illustrates a two-step (real intermediate excited state) technique, and FIG. 1C illustrates a two-step (two species) technique;

DESCRIPTION OF THE PREFERRED EMBODIMENTS

Crystal growth

A crystal of $BaTiO_3$ doped with Ce and Rh was grown by the top-seeded solution growth (TSSG) method, although other suitable methods may also be used in the practice of the present invention. The melt, consisting of a mixture of 34 mol % BaO and 66 mol % $TiO_2$, had previously been prepared from a mixture of $BaCO_3$ and $TiO_2$ and had been used to grow several crystals prior to the one described here. In three crystal growth runs prior to this one, the melt had been doped with Rh (in the form of $RhO_2$) at a concentration of 1600 ppm atomic (with respect to the ratio of Rh/Ba in the melt). The melt was replenished with $BaTiO_3$ to compensate for the amount removed in each crystal growth run; however, no new Rh dopant was added. Thus, the actual concentration of Rh in the melt was less than 1600 ppm. Immediately prior to the growth run in question, $CeO_2$ was added to the melt at a concentration sufficient to produce a ratio of Ce/Ba in the melt of 15 ppm atomic. The growth run was carried out in the usual fashion for TSSG of $BaTiO_3$; see, e.g., D. Rytz et al, *Journal of Crystal Growth*, Vol. 99, pp. 864–868 (1990). The cooling rate varied from about 0.15° C./h at the beginning of the run to about 0.7° C./h at the end of the run. The melt was cooled from a temperature of 1393° C. to 1336° C. and the crystal was pulled at a rate of ~0.18 mm/h during growth. The crystal was also rotated at a rate of 60 rpm during the growth. At the completion of growth, the crystal was raised until it was out of the melt, and the furnace was then cooled at a rate of 20°/h to room temperature. This crystal is identified as boule number BT408.

The boule was cut into several pieces, one of which (hereinafter called BT408A) with dimensions of 8.6×9.2× 10.3 $mm^3$, was polished, electrically poled (i.e., rendered into essentially a single-domain state by application of an electric field), and then re-polished. It was observed initially that pieces of the boule kept under dark conditions had an orange color when viewed in room lights, whereas pieces that were continually left under room lights developed a brown appearance.

This was the first indication that a color change (photochromism) like that mentioned above was in fact taking place at the very low intensities provided by laboratory lighting.

Energy level structure of double-doped crystal

Figure 2:
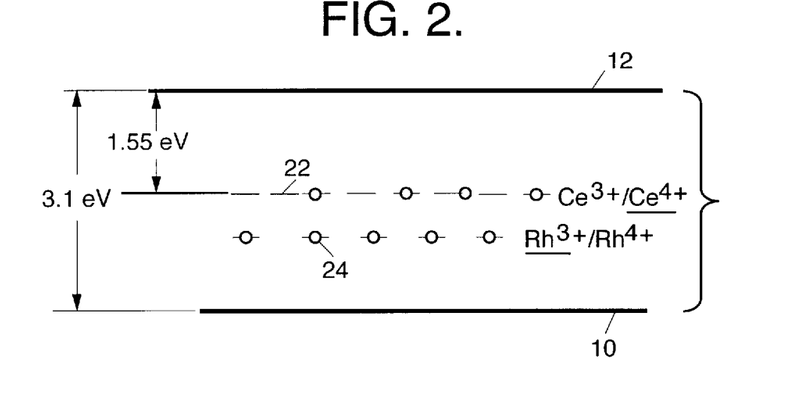
FIG. 2 is a schematic band diagram of $BaTiO_3$:Ce,Rh showing ionization levels of the two active species under dark (thermal equilibrium) conditions; the underlined valence state for each species has the larger population.

Previous studies of the dark grating decay in Ce-doped $BaTiO_3$ have shown that the decay is very slow, with extrapolated values estimated to be thousands of years at room temperature; see, e.g., G. D. Bacher et al, supra. The reason for the long dark decay is that the $Ce^{3+}/Ce^{4+}$ ionization level is located almost exactly at mid-gap (~1.5 eV from the conduction or valence band edge). From separate dark decay measurements of rhodium-doped $BaTiO_3$, it is known that the $Rh^{3+}/Rh^{4+}$ ionization level lies at ~1.1 eV from the valence band edge (see FIG. 2). It is also known that $Rh^{4+}$ is easily photoionized at wavelengths in the red and near infrared, leading to the generation of a free hole and $Rh^{3+}$. In a double-doped crystal, the desirable position for the Fermi level in equilibrium (crystal in the dark) is at the $Ce^{3+}/Ce^{4+}$ ionization level. In this case, all rhodium would be in the 3+ valence state and no infrared absorption is present. To create $Rh^{4+}$ (and thus sensitize the crystal), one can either photoionize $Ce^{4+}$ to create a hole in the valence band, which recombines with $Rh^{3+}$ to form $Rh^{4+}$, or one can photoionize an electron from $Rh^{3+}$ to the conduction band, converting it to $Rh^{4+}$. (The electron in the conduction band may recombine with $Ce^{4+}$ to form $Ce^{3+}$.) The crystal is now sensitized for IR recording.

Optical absorption

Optical absorption spectra of the crystal BT408A were obtained using a Perkin-Elmer λ9 Spectrophotometer. The transmission spectrum of the crystal was first measured after it had been stored in the dark for ~3 days. Subsequently, the sample was exposed to white light from a microscope illuminator for 15 minutes and then the measurement of the transmission spectrum was repeated. All values were then converted to absorption coefficients; the results for the two different conditions are compared in FIG. 3.

Figure 3:
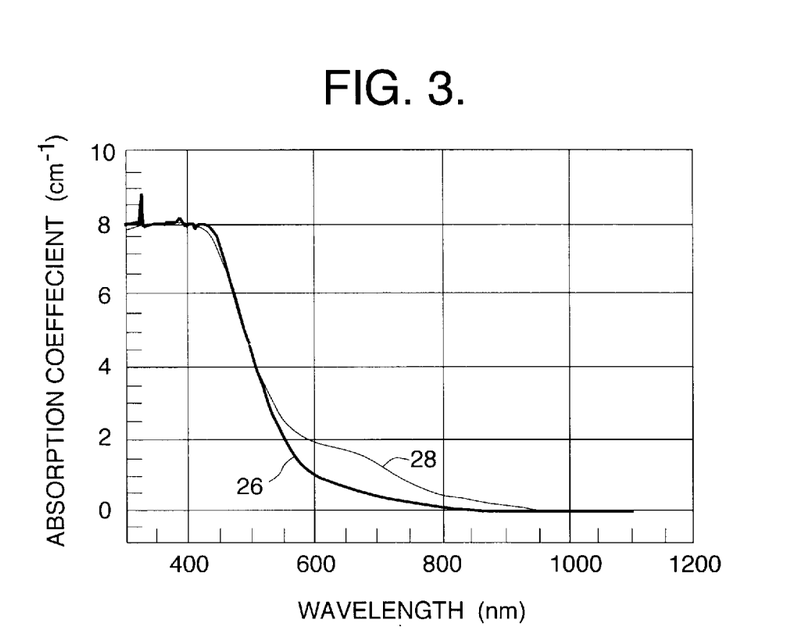
FIG. 3 depicts the optical absorption spectra of one double-doped barium titanate crystal of the present invention before and after illumination with white light from a microscope illuminator.

The absorption spectrum before illumination (Curve 26) appears to be quite similar to that obtained for an intentionally Ce-doped sample purchased from ITI Electro-Optics. Following illumination (Curve 28), the absorption in the region between ~500 and 1000 nm was enhanced. The induced absorption peaks near 650 nm and closely resembles the spectrum found in an intentionally Rh-doped sample; see, e.g., B. A. Wechsler et al, supra. This strongly suggests that the $Rh^{4+}$ absorption is dependent upon prior illumination with light (which in the case of the observations described here was broadband). In the absence of such illumination, or following some relaxation period in the dark following illumination, the $Rh^{4+}$ absorption is absent, suggesting that the valence state of the Rh is something other than 4+ (and presumably 3+).

Color changes have also been observed resulting from laser illumination. When the crystal is exposed to a blue-green laser beam (488/515 nm from an $Ar^+$-ion source), a dark, bluish-green track is easily observed m the laser's path through the crystal. This color change has a decay time constant in the dark of 11 hours at room temperature and can easily and quickly be reversed by exposing the crystal to red or infrared (633 to 1064 nm) light. The color change can also be reversed by exposing the sensitized crystal to broadband illumination from a heat lamp.

Electron Paramagnetic Resonance spectroscopy

Figure 4A:
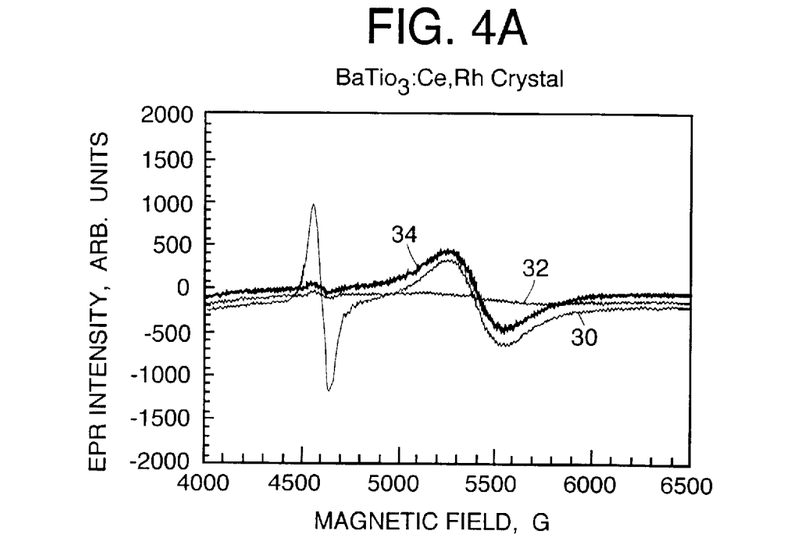
FIGS. 4A and 4B depict the electron paramagnetic resonance spectra of another double-doped barium titanate crystal of the present invention, with FIG. 4A taken before any illumination and during and after illumination with 754 nm light, and with FIG. 4B taken after illumination with 754 nm light and then during and after illumination with 488/515 nm light.
Figure 4B:
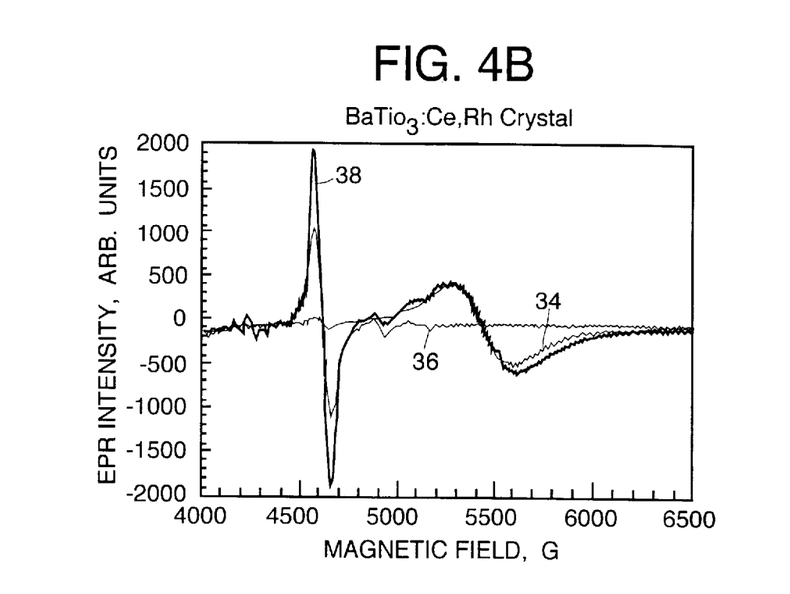

A single crystal sample from boule number BT408 was cut for investigation by electron paramagnetic resonance (EPR) spectroscopy. This sample had dimensions of 2×2×4 $mm^3$, with the longest direction parallel to the [110] direction of the pseudo-cubic unit cell of $BaTiO_3$. A series of spectra were obtained in which the effects of illumination at different wavelengths were observed (FIGS. 4A and 4B). All spectra were obtained at a temperature of ~15K. The frequency was 9.25 GHz, microwave power was ~1 mW and the modulation amplitude was 2 G. A spectrum (Curve 30) was first obtained (FIG. 4A) after the crystal was held in the dark for several hours at room temperature before being introduced into the microwave cavity and being cooled. In this spectrum, signals due to $Rh^{4+}$ (~4600 G), $Ce^{3+}$ (~5400 G), as well as $Fe^{3+}$ and one or more unidentified species (not shown) are present. The crystal was then illuminated with light of 754 nm wavelength at a power of 270 mW (Curve 32). While the light was on, both the $Ce^{3+}$ and $Rh^{4+}$ signals essentially disappeared, but when the light was turned off (Curve 34), the $Ce^{3+}$ signal returned immediately to its intensity prior to illumination, whereas the $Rh^{4+}$ signal was reduced in magnitude by more than 10× (estimated) from its intensity prior to illumination. Next (FIG. 4B), the sample was illuminated with a mixture of 488 and 515 nm light from an $Ar^+$-ion laser with a power of ~260 mW (Curve 36). During this illumination, a strong signal from $Rh^{4+}$, no signal from $Ce^{3+}$, and significant changes in other signals (unidentified) in the spectrum were observed. When the light was turned off (Curve 38), the $Rh^{4+}$ signal was much stronger than it was during illumination as well as stronger than it was in the initial state. The $Ce^{3+}$ signal appeared to be about the same strength as the initial state. In addition, there were significant changes in the intensities of other unidentified resonances as well as the appearance of signals that had not been present either initially or before illumination with 488/515 nm light. These results indicate that charges can be redistributed between different trapping centers by exposure to light. Exposure to visible light (488/515 nm) produces a decrease in the $Rh^{3+}/Rh^{4+}$ ratio, whereas exposure to infrared light (754 nm) produces an increase in the $Rh^{3+}/Rh^{4+}$ ratio.

Photorefractive measurements

Figure 5:
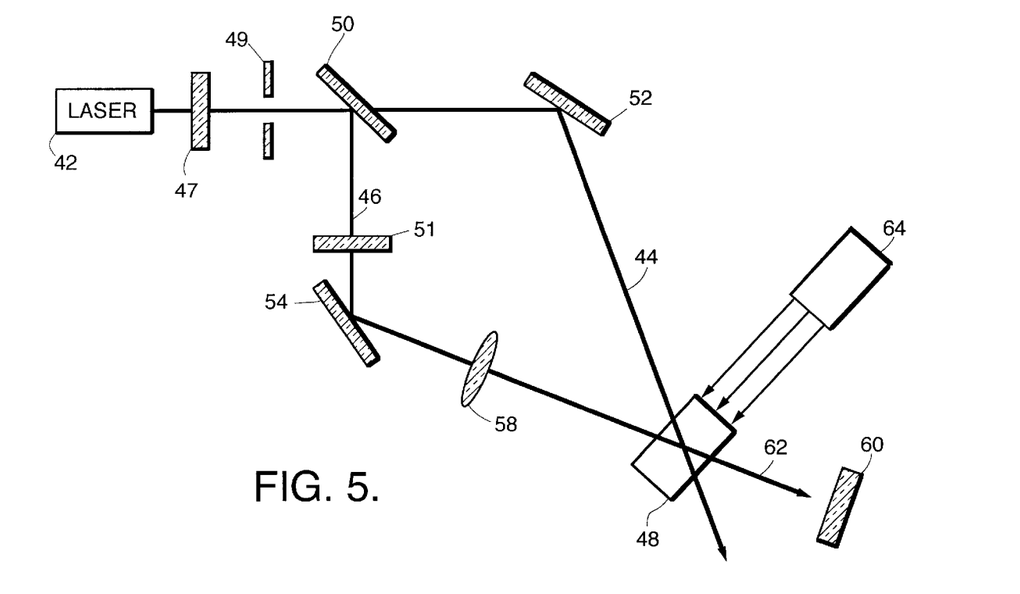
FIG. 5 is a schematic diagram of a holographic recording/retrieval system incorporating a photorefractive crystal suitable for use with a sensitized recording technique.

Crystal BT408A was studied using photorefractive beam-coupling techniques (see FIG. 5). An infrared laser ($Ar^+$-ion pumped Ti:sapphire operating at 900 nm) 42 was used to generate two interfering recording beams 44, 46 in the crystal 48. The laser beam 42 was passed through certain beam defining and conditioning optical elements, including a spatial filter and a beam expander, shown as combined element 47, and an aperture 49, before being split into two beams using a beam-splitter 50. The intensity for one recording beam (pump) 44 was ~2 $W/cm^2$, and the intensity for the second recording beam (probe) 46 was attenuated using a neutral density filter 51 to ~100 $mW/cm^2$. The pump beam 44 was directed onto the crystal 48 by a mirror 52; the probe beam 46 was directed by a mirror 54 through a lens 58 and onto the crystal 48. The grating wavevector was along the c-direction of the crystal, and the full external crossing angle was 47°, corresponding to a grating spacing of 1.8 $\mu$m. Before exposing the crystal to visible light, only a weak photorefractive grating could be obtained, with roughly 15% energy transfer into the weaker beam. A photodetector 60 detected the output beam 62 from the crystal 48. The apparatus shown in FIG. 5 is well-known in the art.

The crystal 48 was then illuminated with blue-green light from an $Ar^+$-ion laser (multi-line) 64 at an intensity of 3.5 to 4 $W/cm^2$. With this "gating" light on, a substantially higher coupling efficiency of the infrared beams was observed. The time constant of the writing process also decreased markedly when the blue-green light was on. After the blue-green light was turned off, the coupling continued to increase, reaching a peak of ~55% energy transfer.

Figure 6:
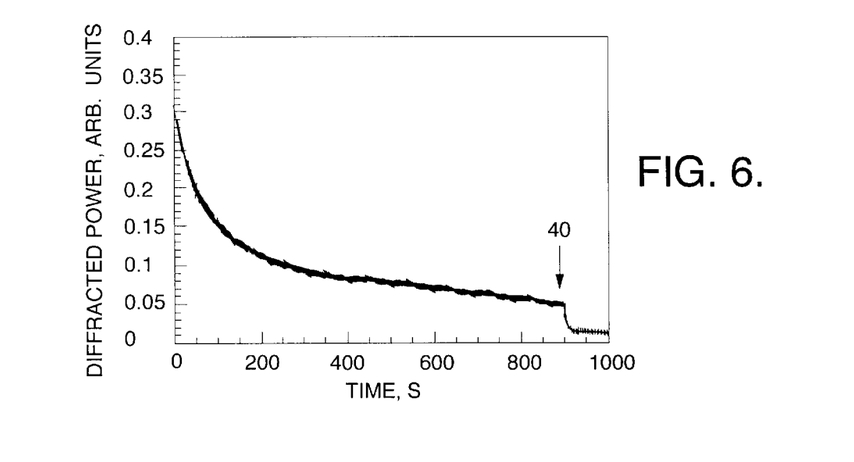
FIG. 6, on coordinates of diffracted power (in arbitrary units) and time (in seconds), is a measurement of the decay of the photorefractive grating in double-doped barium titanate crystal employed in FIG. 3 under constant illumination with a 900 nm erase beam (~2 $W/cm^2$).

Next, the intensity of the diffracted signal was measured with the 900 nm pump beam on and with the probe beam and the blue-green gating beam off (see FIG. 6). With the probe beam blocked, the pump beam acts to erase the grating. At the same time, the diffraction from the grating can be used to measure the grating decay rate. The decay under constant illumination with the infrared pump/erase beam operating at around 2 $W/cm^2$ appeared to be a composite with two main components. The initial part of the decay was fast (~2/3 of the initial diffraction efficiency decayed in about 90 s). Subsequently, the decay was much slower, with a decay constant on the order of hours. When the blue-green beam was turned on (shown at 40), the diffracted signal dropped quickly to zero (the apparent offset from zero diffraction following erasure with a blue-green beam is due to background light and is not significant). Most likely, the initial rapid decay originated from that part of the grating which remained in the shallow ($Rh^{3+}/Rh^{4+}$) level. The later, slower decay is assumed to originate from the deep ($Ce^{3+}/Ce^{4+}$) level. We believe that at longer wavelengths, the decay time can be extended, or the decay can be eliminated altogether. Nevertheless, it is worth noting that the erase beam fluence in this experiment was greater than that typically used in reading stored holograms. Thus, even this slow decay process may be relatively unimportant for practical usage in holographic storage applications.

Additional Considerations

The foregoing experiments have demonstrated the essential features needed for nondestructive readout of a holographic storage material. In its initial state, having been kept in the dark, the crystal was highly insensitive to grating formation at infrared wavelengths (900 nm). Illumination with a blue-green "gating" beam rendered the crystal considerably more sensitive at 900 nm. After an initial rapid decay, the gratings were highly resistant to further decay under constant illumination at 900 nm. In this experiment, on the order of 25 to 30% of the original diffraction efficiency was stored in this relatively non-volatile form. Finally, the gratings could be quickly erased by illuminating the crystal with blue-green light. Measurements of the dark decay rate at elevated temperatures in crystal BT408A suggest that at room temperature the dark storage time is approximately 10 years. Dark decay measurements in a second crystal, which had a higher Ce concentration, indicate the room temperature dark storage time is approximately 300 years. In this connection, the phrase "room temperature" is intended to denote that temperature of about 20° C.

By incorporating two different dopants, Ce and Rh, into $BaTiO_3$, the properties of the crystal can be manipulated in a way that is beneficial for the long-term storage of information as refractive index gratings. The ideal situation can be pictured as in FIG. 2, where a schematic is shown of the bandgap of $BaTiO_3$ with ionization centers involving $Rh^{3+}$/$Rh^{4+}$ and $Ce^{3+}$/$Ce^{4+}$. In real crystals, other ionization levels are also present and will complicate the interpretation of our experimental data, but it is believed that their presence is not essential to the behavior of the crystal. Under dark conditions (i.e., thermal equilibrium at or near room temperature, with no illumination), it is expected that the Fermi level of this system will be located close to the $Ce^{3+}$/$Ce^{4+}$ level. Thus, most of the Rh will be present in the 3+ valence state, and the Ce may be present in both the 3+ and 4+ valence states. When subjected to illumination with relatively short wavelengths (e.g., 488/515 nm, and/or white light) there is a redistribution of charge between Rh, Ce, and possibly other extant defect centers in the crystal such that there is a long-lived but presumably metastable state in which a substantial fraction of the Rh is in the 4+ valence state. Since crystals containing $Rh^{4+}$ are known to be photorefractively sensitive in the near-IR, whereas crystals containing $Rh^{3+}$ are not, the crystal in this state is able to record index gratings under illumination by interfering infrared laser beams. Thus, a crystal that would otherwise be insensitive to recording at IR wavelengths has, by using the blue-green "gating" light, been made sensitive to infrared light. Although this may appear to be somewhat similar to the results presented by Buse et al supra, we note that in the case of the $BaTiO_3$:Ce,Rh crystal of the present invention, the power levels needed to sensitize the crystal are on the order of $mW/cm^2$ or $W/cm^2$, rather than hundreds of $W/cm^2$ or more needed to sensitize crystals as has been demonstrated previously. In addition, the concentrations of both species that are participating in the process have been controlled and, further, a long dark storage time has also been simultaneously achieved.

In this connection, the concentration of both dopant species, here, cerium and rhodium, is within the range of about $2 \times 10^{16}$ to $1 \times 10^{19}$ $ions/cm^3$. The minimum corresponds to a concentration of the dopant species in an amount of about 1 part-per-million by weight (ppmw), which is sufficient to give the crystals the distinctive blue or orange colors of these individual dopants. Any concentration above this limit is photorefractively useful. However, a maximum of $1 \times 10^{19}$ $ions/cm^3$ is probably the upper practical limit, even at longer wavelengths.

In the practice of the present invention, the sensitizing beam wavelength should be in the range of about 400 to less than 620 nm, and the recording, or writing, beam wavelength should be in the range of greater than 620 to about 1100 nm.

During recording or after the grating is written by light of infrared wavelength in the "sensitized" crystal (which principally involves photoionization from $Rh^{4+}$ centers and recombination in $Rh^{3+}$ and/or other centers), charge redistribution takes place which results in the "transfer" of the grating spatial information into the Ce centers. This may involve carriers photoionized from Rh centers recombining with Ce centers, or other processes. Once the crystal has relaxed into the dark equilibrium state, further charge redistribution will be governed by the dark conductivity of the crystal. Because the $Ce^{3+}$/$Ce^{4+}$ ionization level has been shown to be almost exactly in the middle of the bandgap, it is expected that the charge distribution should display a decay time on the order of hundreds or thousands of years. Furthermore, since the Ce centers themselves are very insensitive to light of infrared wavelengths (longer than, say, 800 to 900 nm), the grating should also be extremely resistant to erasure by light during subsequent readout of the stored information.

The experiments performed thus far do not necessarily reflect the ultimate performance of the double-doped barium titanate crystal of the present invention for nonvolatile holographic recording. A number of factors need to be considered in order to optimize the writing sensitivity and the diffraction efficiency of the stored gratings while minimizing the sensitivity to erasure during readout. These include the absolute and relative concentrations of the two dopants, Ce and Rh, as well as the $Ce^{3+}$/$Ce^{4+}$ ratio. In addition, the effect of recording wavelength must be carefully investigated in order to determine the dependence of erasure rate on the wavelength.

The space charge field of the gratings written in the Ce centers depends upon the ratio of filled and empty Ce traps, i.e., the $Ce^{3+}$/$Ce^{4+}$ ratio. In order to optimize the diffraction efficiency of the stored gratings, it is important to be able to adjust this ratio. This corresponds to adjusting the Fermi level in the crystal. The Fermi level can in general be modified using oxidationreduction processing, in which the crystal is heated in an atmosphere with a controlled oxygen partial pressure. Reducing the oxygen partial pressure results in a higher Fermi level, corresponding to an increase in the number of traps filled with electrons. Preliminary experiments demonstrate that the Fermi level can in fact be raised by annealing $BaTiO_3$:Ce,Rh in a reducing atmosphere. A sample of crystal BT409 was heated at 700° C. for 20 h in an atmosphere of 50% $CO$ +50% $CO_2$, corresponding to an oxygen partial pressure of about $10^{-21}$ bar (the total pressure was about 1 bar). Following this heat treatment, the sample had the characteristic color of $BaTiO_3$:Ce, and the color did not change as a result of exposure to light, whereas before the heat treatment, the color was sensitive to illumination. This result demonstrates that the reduction treatment effectively filled the traps involved in charge transfer processes responsible for the sensitization process in the as-grown crystal. This is strong evidence that $Ce^{4+}$ centers are in fact involved in this process and that the $Ce^{3+}$/$Ce^{4+}$ ratio can be modified by reduction. Further experiments are required to find conditions for this reduction process that optimize the strength of the grating stored in the deep level.

From the preceding discussion, it will be appreciated by those skilled in this art that other pairs of dopants may also be employed in the practice of the invention. In particular, two dopant species, both of which have at least two valence states, may be used to double-dope the $BaTiO_3$ crystal. One of the dopant species (cerium, in the example herein) has an ionization level that lies near the center of the $BaTiO_3$ bandgap and the other dopant species (rhodium, in the example herein) lies closer to the valence band edge. As substitutes for rhodium, other dopants could be found whose ionization level lies closer to the valence band or the conduction band. The shallower level should be sensitive to infrared radiation, but still close enough to mid-gap that charges excited to it persist in the dark for a long time, as discussed above. On the other hand, the level at mid-gap should be sensitive to visible radiation but insensitive at the infrared recording wavelength, such that the dark storage time is years or longer.

In this connection, it will be appreciated that while in the ideal situation, only the dopant species at the shallower level is sensitive to infrared radiation, in practice, the other dopant species may also be somewhat sensitive to infrared radiation—but much less so than the dopant species at the shallower level.

Thus, there has been disclosed a BaTiO$_3$ crystal doped with both rhodium and cerium, useful as a holographic storage medium. It will be apparent to those skilled in this art that a variety of changes and modifications of an obvious nature may be made, and all such changes and modifications are considered to fall within the scope of the appended claims.

What is claimed is:

1. A double-doped barium titanate crystal having a conduction band edge and a valence band edge separated by a bandgap and doped with a first dopant species and a second dopant species, both dopant species having at least two valence states, said first dopant species having an ionization level that is near the middle of said bandgap and said second dopant species having an ionization level that is closer to either said valence band edge or said conduction band edge, such that both dopant species are sensitive to visible light and said dopant species which is closer to said valence band edge or said conduction band edge is substantially more sensitive to infrared radiation than said dopant species that is near the middle of said bandgap, wherein said second dopant species consists essentially of rhodium.

2. The double-doped barium titanate crystal of claim 1 wherein said first dopant species consists essentially of cerium.

3. A double-doped barium titanate crystal doped with both cerium and rhodium.

4. The double-doped barium titanate crystal of claim 3 wherein said cerium has a concentration that is in a range of about $2\times10^{16}$ to $1\times10^{19}$ ions/cm$^3$.

5. The double-doped barium titanate crystal of claim 3 wherein said rhodium has a concentration that is in a range of about $2\times10^{16}$ to $1\times10^{19}$ ions/cm$^3$.

6. A holographic recording element comprising a double-doped barium titanate crystal having a conduction band edge and a valence band edge separated by a bandgap and doped with a first dopant species and a second dopant species, both dopant species having at least two valence states, said first dopant species having an ionization level that is near the middle of said bandgap and said second dopant species having an ionization level that is closer to said valence band edge or said conduction band edge, such that both dopant species are sensitive to visible light and said second dopant species is substantially more sensitive to infrared radiation than said first dopant species, wherein said second dopant species consists essentially of rhodium.

7. The holographic recording element of claim 6 wherein said first dopant species consists essentially of cerium.

8. A holographic recording element comprising a double-doped barium titanate crystal having a conduction band edge and a valence band edge separated by a bandgap and doped with a first dopant species and a second dopant species, both dopant species having at least two valence states, said first dopant species having an ionization level that is near the middle of said bandgap and said second dopant species having an ionization level that is closer to said valence band edge or said conduction band edge, such that both dopant species are sensitive to visible light and said second dopant species is substantially more sensitive to infrared radiation than said first dopant species, wherein said first dopant species consists essentially of rhodium and said second dopant species consists essentially of cerium.

9. The holographic recording element of claim 8 wherein rhodium has a concentration that is in a range of about $2\times10^{16}$ to $1\times10^{19}$ ions/cm$^3$ and wherein cerium has a concentration that is in a range of about $2\times10^{16}$ to $1\times10^{19}$ ions/cm$^3$.

10. A method of providing a double-doped barium titanate crystal able to be nondestructively read-out at an infrared wavelength, said double-doped barium titanate crystal having a conduction band edge and a valence band edge separated by a bandgap, said method comprising doping a barium titanate crystal with a first dopant species and a second dopant species, both dopant species having at least two valence states, said first dopant species having an ionization level that is near the middle of said bandgap and said second dopant species having an ionization level that is closer to said valence band edge or said conduction band edge, such that both dopant species are sensitive to visible light and said second dopant species is substantially more sensitive to infrared radiation than said first dopant species, wherein said first dopant species consists essentially of cerium and said second dopant species consists essentially of rhodium.

11. The method of claim 10, wherein rhodium has a concentration that is in a range of about $2\times10^{16}$ to $1\times10^{19}$ ions/cm$^3$ and wherein cerium has a concentration that is in a range of about $2\times10^{16}$ to $1\times10^{19}$ ions/cm$^3$.

12. The method of claim 10 wherein said double-doped barium titanate crystal is formed by growing said barium titanate crystal by top-seeded solution growth.

13. A method of recording information on a holographic storage medium comprising a double-doped barium titanate crystal having a conduction band edge and a valence band edge separated by a bandgap, comprising:

(a) providing said double-doped barium titanate crystal, doped with a first dopant species and a second dopant species, both dopant species having at least two valence states, said first dopant species having an ionization level that is near the middle of said bandgap and said second dopant species having an ionization level that is closer to said valence band edge or said conduction band edge, such that both dopant species are sensitive to visible light and said second dopant species is substantially more sensitive to infrared radiation than said first dopant species; and (b) writing information by first sensitizing said double-doped barium titanate crystal with a substantially uniform sensitizing beam of radiation at one wavelength and then either simultaneously or subsequently storing information in said double-doped barium titanate crystal with incident writing beams that have a wavelength that is longer than that of said sensitizing beam, such that nondestructive read-out can be accomplished using only one of said writing beams, wherein said first dopant species consists essentially of cerium and said second dopant species consists essentially of rhodium.

14. The method of claim 13, wherein rhodium has a concentration that is in a range of about $2\times10^{16}$ to $1\times10^{19}$ ions/cm$^3$ and wherein cerium has a concentration that is in a range of about $2\times10^{16}$ to $1\times10^{19}$ ions/cm$^3$.

15. The method of claim 13 wherein said sensitizing beam has a wavelength that is in a range of about 400 to less than 620 nm and said writing beam has a wavelength that in a range of greater than 620 to about 1100 nm.

16. A method of recording information on a holographic storage medium comprising a double-doped barium titanate crystal having a conduction band edge and a valence band edge separated by a bandgap and reading out information recorded therein, comprising:

(a) providing said double-doped barium titanate crystal, doped with a first dopant species and a second dopant species, both dopant species having at least two valence states, said first dopant species having an ionization level that is near the middle of said bandgap and said second dopant species having an ionization level that is closer to said valence band edge or said conduction band edge, such that both dopant species are sensitive to visible light and said second dopant species is substantially more sensitive to infrared radiation than said first dopant species;

(b) writing information by first sensitizing said double-doped barium titanate crystal with a substantially uniform sensitizing beam of radiation at one wavelength and then either simultaneously or subsequently storing information in said double-doped barium titanate crystal with incident writing beams that have a wavelength that is longer than that of said sensitizing beam, such that nondestructive read-out can be accomplished using only one of said writing beams; and (c) reading out said information by illuminating said double-doped barium titanate crystal with said longer wavelength beam, wherein said first dopant species consists essentially of cerium and said second dopant species consists essentially of rhodium.

17. The method of claim 16, wherein rhodium has a concentration that is in a range of about $2\times10^{16}$ to $1\times10^{19}$ ions/cm$^3$ and wherein cerium has a concentration that is in a range of about $2\times10^{16}$ to $1\times10^{19}$ ions/cm$^3$.

18. The method of claim 16, wherein said sensitizing beam has a wavelength that is in a range of about 400 to less than 620 nm and said writing beam has a wavelength that in a range of greater than 620 to about 1100 nm.

* * * * *